(12) United States Patent
Yokoi (10) Patent No.: US 11,280,894 B2
(45) Date of Patent: Mar. 22, 2022

(54) OBJECT DETECTION DEVICE, OBJECT DETECTION METHOD AND NON-TRANSITORY COMPUTER READABLE STORAGE MEDIUM FOR STORING PROGRAMS THEREOF

(71) Applicant: DENSO CORPORATION, Kariya (JP)

(72) Inventor: Yusuke Yokoi, Kariya (JP)

(73) Assignee: DENSO CORPORATION, Kariya (JP)

( * ) Notice: Subject to any disclaimer, the term of this patent is extended or adjusted under 35 U.S.C. 154(b) by 395 days.

(21) Appl. No.: 16/359,449

(22) Filed: Mar. 20, 2019

(65) Prior Publication Data

US 2019/0293776 A1   Sep. 26, 2019

(30) Foreign Application Priority Data

Mar. 26, 2018 (JP) .............................. JP2018-057794

(51) Int. Cl.
*G01S 13/56* (2006.01)
*G01S 7/35* (2006.01)
*G01S 13/931* (2020.01)
*G01S 13/34* (2006.01)

(52) U.S. Cl.
CPC .............. *G01S 13/56* (2013.01); *G01S 7/352* (2013.01); *G01S 13/34* (2013.01); *G01S 13/931* (2013.01)

(58) Field of Classification Search
CPC ...... G01S 13/34; G01S 13/343; G01S 13/345; G01S 13/56; G01S 13/931
See application file for complete search history.

(56) References Cited

U.S. PATENT DOCUMENTS

| 10,855,328 B1* | 12/2020 | Gulati | G01S 7/0232 |
|---|---|---|---|
| 2009/0121915 A1* | 5/2009 | Randler | G01S 13/931 342/70 |
| 2010/0271257 A1* | 10/2010 | Hirogari | G01S 13/726 342/107 |
| 2011/0309968 A1* | 12/2011 | Reiher | G01S 7/354 342/70 |
| 2012/0169523 A1* | 7/2012 | Lee | G01S 13/931 342/21 |
| 2012/0242531 A1* | 9/2012 | Itoh | G01S 13/931 342/107 |
| 2014/0139368 A1* | 5/2014 | Takaki | G01S 13/723 342/70 |

(Continued)

FOREIGN PATENT DOCUMENTS

| JP | 2006-080761 A | 3/2006 |
|---|---|---|
| JP | 2008-082973 A | 4/2008 |

(Continued)

*Primary Examiner* — Peter M Bythrow
(74) *Attorney, Agent, or Firm* — Maschoff Brennan (57) ABSTRACT

An electronic control unit or ECU as an object detection device is mounted on an own vehicle equipped with a millimeter wave sensor. The ECU provides functions of a first detection part, a second detection part and a presence probability calculation part. The first detection part performs a FMCW method, and the second detection part performs a FCM method so as to detect presence of a detection target on the basis of detection results of the millimeter wave sensor. The presence probability calculation part calculating a presence probability of the detection target on the basis of the detection results of the first detection part and the second detection part.

10 Claims, 6 Drawing Sheets

(56) References Cited

U.S. PATENT DOCUMENTS

| | | | | |
|---|---|---|---|---|
| 2014/0218228 | A1* | 8/2014 | Noda | G01S 13/584 |
| | | | | 342/147 |
| 2015/0109164 | A1* | 4/2015 | Takaki | G01S 7/41 |
| | | | | 342/27 |
| 2015/0183431 | A1* | 7/2015 | Nanami | B60R 21/01 |
| | | | | 701/301 |
| 2015/0355315 | A1* | 12/2015 | Shimizu | G01S 13/931 |
| | | | | 342/107 |
| 2017/0080929 | A1* | 3/2017 | Sawamoto | B60W 30/0956 |
| 2017/0082744 | A1* | 3/2017 | Matsumoto | G01S 7/352 |
| 2017/0097409 | A1* | 4/2017 | Okamoto | G01S 13/34 |
| 2017/0115386 | A1* | 4/2017 | Morinaga | G01S 13/53 |
| 2017/0307727 | A1* | 10/2017 | Goda | G01S 13/584 |
| 2018/0031688 | A1* | 2/2018 | Hesse | G01S 13/931 |
| 2018/0095173 | A1* | 4/2018 | Kurono | G01S 13/584 |
| 2018/0208193 | A1* | 7/2018 | Takahashi | B60W 30/085 |
| 2018/0313935 | A1* | 11/2018 | Fujitsu | G01S 13/42 |
| 2018/0348363 | A1* | 12/2018 | Matsunaga | B60W 30/095 |
| 2018/0361973 | A1* | 12/2018 | Harada | B60R 21/0134 |
| 2019/0004146 | A1* | 1/2019 | von Rhein | G01S 13/32 |
| 2020/0142026 | A1* | 5/2020 | Bush | G01S 13/89 |
| 2021/0003695 | A1* | 1/2021 | Akamine | G01S 7/352 |

FOREIGN PATENT DOCUMENTS

| | | |
|---|---|---|
| JP | 2009-210337 A | 9/2009 |
| JP | 2010-071805 A | 4/2010 |
| JP | 2014-006123 A | 1/2014 |

\* cited by examiner

PRESENCE PROBABILITY ADJUSTMENT MAP 15
USED IN FIRST EXEMPLARY EMBODIMENT

| CASES | DETECTION RESULTS | | PRESENCE PROBABILITY CHANGE |
|---|---|---|---|
| | FIRST DETECTION METHOD (FMCW) | SECOND DETECTION METHOD (FCM) | |
| 1 | ○ | ○ | + |
| 2 | ○ | × | 0 |
| 3 | △ | ○ | + |
| 4 | × | ○ | 0 |
| 5 | × or △ | × | — |

FIG.4

PRESENCE PROBABILITY ADJUSTMENT MAP 15-1
USED IN SECOND EXEMPLARY EMBODIMENT

| CASES | DETECTION TARGET DISTANCE DIFFERENCE | PRESENCE PROBABILITY CHANGE |
|---|---|---|
| 1a | 0~0.5 (m) | +10% |
| 2a | 0.5~1.5 (m) | +5% |
| 3a | 1.5~2.0 (m) | 0 |
| 4a | 2.0~4.0 (m) | −5% |
| 5a | 4.0~ (m) | −10% |

PRESENCE PROBABILITY ADJUSTMENT MAP 15-2
USED IN THIRD EXEMPLARY EMBODIMENT

| CASES | RELATIVE SPEED DIFFERENCE | PRESENCE PROBABILITY CHANGE |
|---|---|---|
| 1b | 0~3.0 (km/h) | +10% |
| 2b | 3.0~5.0 (km/h) | +5% |
| 3b | 5.0~10 (km/h) | 0 |
| 4b | 10~15 (km/h) | -5% |
| 5b | 15~ (km/h) | -10% |

OBJECT DETECTION DEVICE, OBJECT DETECTION METHOD AND NON-TRANSITORY COMPUTER READABLE STORAGE MEDIUM FOR STORING PROGRAMS THEREOF

CROSS-REFERENCE TO RELATED APPLICATION

This application is related to and claims priority from Japanese Patent Application No. 2018-57794 filed on Mar. 26, 2018, the contents of which are hereby incorporated by reference.

TECHNICAL FIELD

The present disclosure relates to object detection devices, object detection methods and non-transitory computer readable storage mediums for storing programs thereof, to be mounted on vehicles for detecting objects including pedestrians.

BACKGROUND

There have been proposed and used various object devices, to be mounted on vehicles, which detect preceding vehicles and pedestrians travelling and present ahead of an own vehicle on a driving lane so as to realize safety automatic driving of the own vehicle. For example, one of these object devices receives waves on the basis of a Frequency Modulated Continuous Wave (FMCW) method, and performs spectrum analysis of the received waves. The object device detects a peak value of the spectrum obtained by the spectrum analysis, and identifies objects on the basis of the peak value of the spectrum. Those object devices use a single sensor. In addition, for example, there has been proposed another object device using a multiple sensor device composed of a millimeter wave sensor and an image recognition sensor, for example, and performing a sensor fusion algorithm so as to detect and recognize target objects such as preceding vehicles or pedestrians. There is a demand to provide an object device using a single sensor which detects and recognizes objects with high accuracy.

SUMMARY

It is therefore desired to provide an exemplary embodiment of the present disclosure which provides an object detection device to be mounted on an own vehicle. The own vehicle is equipped with a sensor which transmits waves to a detection target in surroundings of the own vehicle, and receives, as detection results, reflected waves reflected by the detection target. The object detection device has a computer system including a central processing unit. The computer system provides functions of a plurality of detection parts and a presence probability calculation part. The plurality of detection parts perform a plurality of object detection methods which are different from each other, and detect presence of a detection target on the basis of detection results of the sensor. The presence probability calculation part calculates a presence probability of the detection target on the basis of detection results of the plurality of detection parts.

BRIEF DESCRIPTION OF THE DRAWINGS

A preferred, non-limiting embodiment of the present disclosure will be described by way of example with reference to the accompanying drawings, in which.

DETAILED DESCRIPTION OF THE PREFERRED EMBODIMENTS

Hereinafter, various embodiments of the present disclosure will be described with reference to the accompanying drawings. In the following description of the various embodiments, like reference characters or numerals designate like or equivalent component parts throughout the several diagrams.

First Exemplary Embodiment

A description will be given of an object detection device 10, an object detection method and a non-transitory computer readable storage medium. The non-transitory computer readable storage medium stores programs which provide functions of the object detection device 10 and the object detection method.

(Structure of the Object Detection Device 10)

Figure 1:
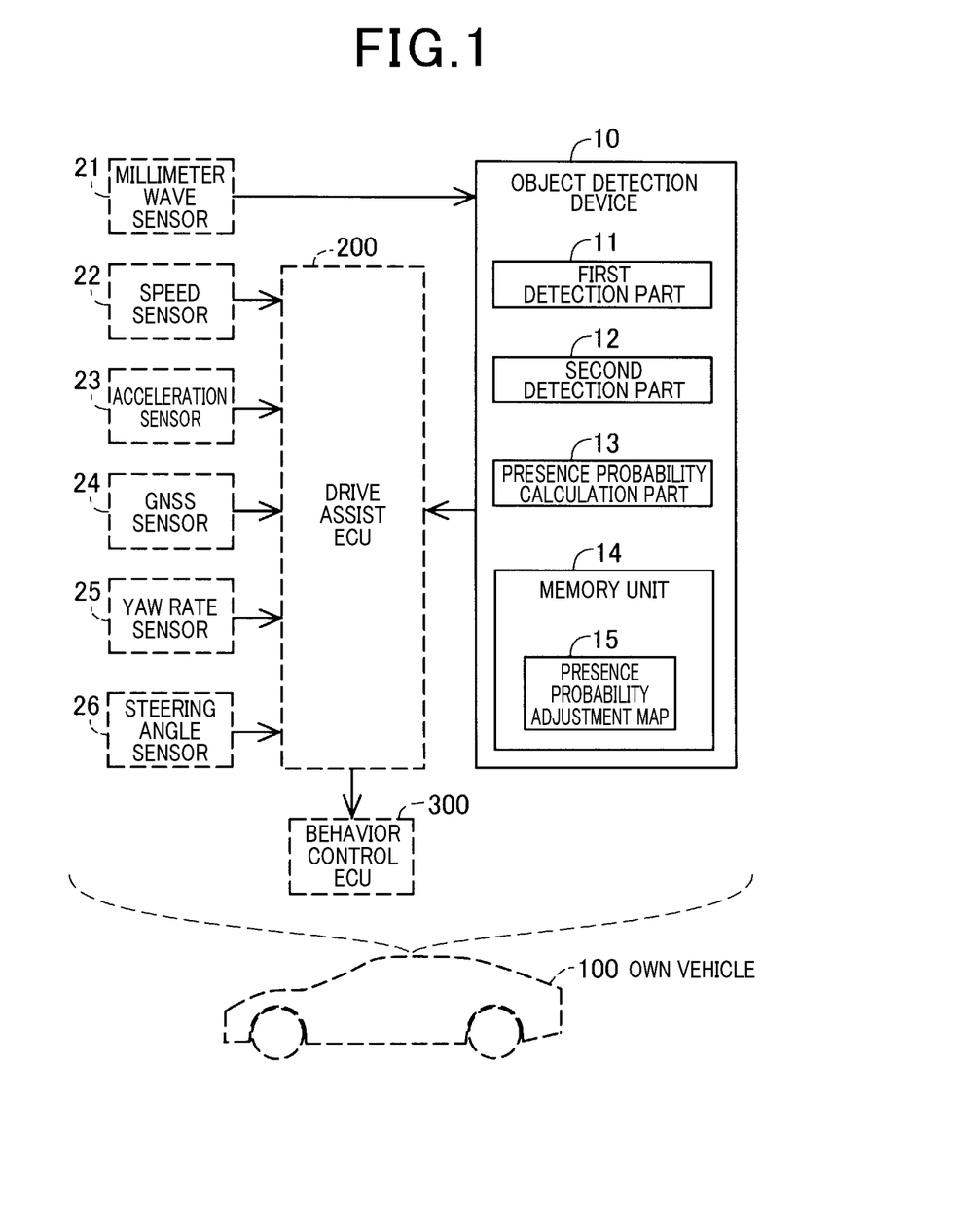
FIG. 1 is a block diagram showing an object detection device, mounted on an own vehicle, according to a first exemplary embodiment of the present disclosure.

FIG. 1 is a block diagram showing the object detection device 10, mounted on an own vehicle 100, according to the first exemplary embodiment of the present disclosure. As shown in FIG. 1, the object detection device 10 is mounted on the own vehicle 100. The object detection device 10 detects objects which are detection targets present around the own vehicle 100, for example, preceding vehicles or pedestrians. The object detection device 10 are electrically connected with a millimeter wave sensor 21 and a drive assist electronic control unit 200 (the drive assist ECU 200), respectively. The object detection device 10 detects the detection targets, i.e. a preceding vehicle or a pedestrian on the basis of transmission waves transmitted form millimeter wave sensor 21 and reflected waves which have been reflected by a detection target. The object detection device 10 transmits a presence probability of the detection target as detection results to the drive assist ECU 200.

The millimeter wave sensor 21 has a voltage control oscillator (VCO), a transmission antenna, a receiving antenna, a mixer, etc.

The VCO is an oscillator which generates an oscillation frequency which is adjusted on the basis of a received voltage. The mixer mixes and transmission signals transmitted from the transmission antenna and received signals received by the receiving antenna, and generates beat signals which are synthesized signals of the transmission signals and the received signals. The object detection device 10 has a first detection part 11 and a second detection part 12. The first detection part 11 and the second detection part 12 adjust the transmission signals which are transmitted through the transmission antenna to outside.

The drive assist ECU 200 controls a behavior control electronic control unit 300 (the behavior control ECU 300) on the basis of detection results of the object detection device 10 and detection results of various types of sensors, which will be explained later, so as to perform driving assist of the own vehicle 100

The behavior control ECU 300 controls the behavior of the own vehicle 100. The behavior control ECU 300 is composed of an engine control electronic control unit (the engine control ECU), a brake electronic control unit (the brake ECU), a steering electronic control unit (the steering ECU), etc.

The engine ECU controls various types of actuators (not shown) so as to control an open/close operation of a throttle valve, an ignition operation of an igniter, and an open/close operation of an intake air valve, etc.

The brake ECU controls operation of a brake device assembly as actuators composed of sensors, motors, valves and pumps. The brake ECU determines a magnitude of braking and a timing at which the brake device assembly brakes movement of the own vehicle 100.

The steering ECU controls operation of a steering device assembly group as actuators. The steering ECU determines a steering amount (i.e. a steering angle) on the basis of detection results transmitted from a yaw rate sensor 25 and a steering angle sensor 26 which will be explained later.

The drive assist ECU 200 is electrically connected to the speed sensor 22, an acceleration sensor 23, a global navigate satellite system sensor 24 (the GNSS sensor 24), the yaw rate sensor 25 and the steering angle sensor 26.

The speed sensor 22, the acceleration sensor 23, the GNSS sensor 24, the yaw rate sensor 25 and the steering angle sensor 26 transmit detection results to the drive assist ECU 200.

The speed sensor 22 detects a moving speed of the own vehicle 100. The acceleration sensor 23 detects an acceleration of the own vehicle 100. The GNSS sensor 24 is composed of a global positioning system sensor (GPS sensor), for example. The GPS sensor receives electromagnetic waves transmitted from a satellite having a GPS, and detects a current location of the own vehicle 100 on the basis of the received electromagnetic waves.

The yaw rate sensor 25 detects a yaw rate (rotation angular velocity) of the own vehicle 100. The steering angle sensor 26 detects a steering wheel angle of the own vehicle 100.

The object detection device 10 according to the first exemplary embodiment is composed of an electronic control unit (ECU). The object detection device 10 has the first detection part 11, the second detection part 12 and a presence probability calculation unit 13.

The ECU forming the object detection device 10 is composed of a central processing unit (CPU), a memory unit 14, an input/output interface (I/O interface), etc. The memory unit 14 is composed of a read only memory (ROM), a random access memory (RAM), etc. The CPU in the ECU forming the object detection device 10 performs programs stored in the memory unit 14 or the non-transitory computer readable storage medium so as to provide functions of the first detection part 11, the second detection part 12 and the presence probability calculation part 13.

The first detection part 11 detects whether a detection target is present ahead of the own vehicle 100 on the basis of detection results of a first detection method using detection results transmitted from the millimeter wave sensor 21.

The first detection method corresponds to a known frequency modulation continuous wave (FMCW) method. The FMCW method uses chirp signals having a rising period and a falling period. In the rising period, a frequency of the chirp signal gradually increases. After the rising period, in more detail, after a predetermined interval time counted from the completion of the rising period, the frequency of the chirp signal gradually reduces in the falling period.

The first detection part 11 receives reflected chirp signals which have been reflected by the detection target such as a preceding vehicle, for example, travelling ahead of the own vehicle 100. The first detection part 11 calculates an-inter-vehicle distance between the own vehicle 100 and the detection target (or calculates the position of the detection target), and a relative speed of the detection target with respective to the own vehicle 100 on the basis of the frequency of the beat signals. The beat signals are synthesized signals of the reflected chirp signals and the transmitted chirp signals.

The second detection part 12 detects whether a detection target is present ahead of the own vehicle 100 on the basis of detection results of the second detection method using detection results transmitted from the millimeter wave sensor 21.

The second detection method corresponds to a known fast-chirp modulation (FCM) method. The FCM method uses sharp chirp signals. A frequency of the chirp signal drastically increases. In other words, an increase rate of the frequency of the sharp chirp signals is extremely high. The second detection part 12 receives reflected sharp chirp signals which have been reflected by the detection target such as a preceding vehicle, for example, travelling ahead of the own vehicle 100. The second detection part 12 calculates the inter-vehicle distance between the own vehicle 100 and the detection target (or calculates the position of the detection target) and the relative speed of the detection target with respective to the own vehicle 100 on the basis of the frequency of the sharp beat signals. The beat signals are synthesized signals of the reflected chirp signals and the transmitted chirp signals.

The presence probability calculation unit 13 calculates a probability of presence of the detection target on the basis of the detection result of the first detection part 11 and the detection result of the second detection part 12. As will be explained later, the presence probability calculation unit 13 periodically performs the calculation of the probability of presence of the detection target. The calculation process of the probability of presence of the detection target will be explained later in detail.

The presence probability calculation unit 13 transmits the calculation result regarding the probability of presence of the detection target to the drive assist ECU 200. In the first exemplary embodiment, the first detection part 11 further transmits the detection results to the drive assist ECU 200. Similarly, the second detection part 12 further transmits the detection results to the drive assist ECU 200.

The drive assist ECU 200 performs the safety driving control of the own vehicle 100 on the basis of the received detection results and the probability of presence of the detection target transmitted from the object detection device 10.

In the first exemplary embodiment, the object detection device 10 performs at least one of following safety operations (a) to (f). That is, the object detection device 10 determines at least one of the following safety operations (1) to (f) on the basis of predetermined values such as a magnitude of the presence probability of the target object, a distance between the own vehicle and a detection target (as a preceding vehicle or a pedestrian), a relative speed of the own vehicle 100 with respect to the detection target, etc. Accordingly, the drive assist ECU 200 perform the overall safety operations (a) to (f) when the presence probability of the detection target transmitted from the object detection device 10 is not less than a predetermined threshold value, for example, not less than 90%. It is acceptable for the drive assist ECU 200 to use another predetermined value instead of using the value of 90%.

(a) The safety operation to close the throttle valves regardless of a depressed amount of the accelerator pedal of the own vehicle;

(b) The safety operation to increase an assist hydraulic pressure of the brake assembly mechanism so as to enhance response characteristics of the driver's brake pedal operation with respect to the brake assembly mechanism;

(c) The safety operation to automatically operate the brake assembly mechanism regardless of the depressed amount of the driver's brake pedal operation so as to reduce the speed of (or to stop) the own vehicle 100;

(d) The safety operation to automatically perform the steering operation of the steering assembly mechanism so as to change a moving direction of the own vehicle 100 to avoid a collision with another vehicle;

(e) The safety operation to vibrate the steering wheels so as to provide warning information to the driver of the own vehicle 100; and (f) The safety operation to automatically rollup the seatbelts of a seatbelt unit so as to suppress vehicle occupants from moving from their seats.

The control programs previously described and a presence probability adjustment map 15 are stored in advance in the memory unit 14. The preparation of the presence probability adjustment map 15 will be explained later in detail.

The object detection device 10 having the structure previously described performs the object detection process which will be explained later. The object detection device 10 provides detection results of the detection target with high accuracy.

(Object Detection Process)

A description will now be given of the object detection process with reference to FIG. 2.

Figure 2:
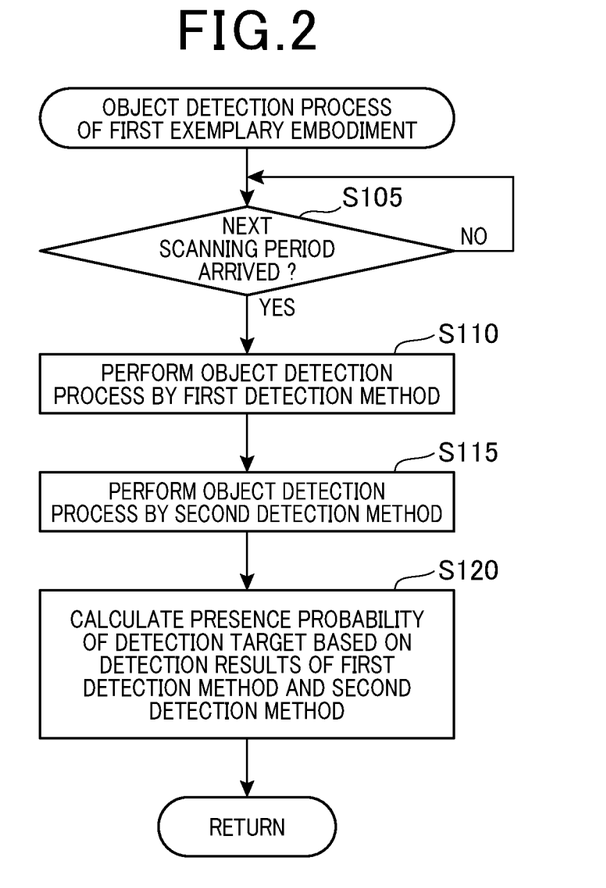
FIG. 2 is a flow chart showing an object detection process performed by the object detection device according to the first exemplary embodiment shown in FIG. 1.

FIG. 2 is a flow chart showing an object detection process performed by the object detection device 10 according to the first exemplary embodiment shown in FIG. 1.

When the driver turns on the ignition key of the own vehicle 100, the object detection device 10 starts to perform the object detection process. In the first exemplary embodiment, the object detection device 10 periodically performs the object detection process to calculate a presence probability of a detection target, and identifies the detection target on the basis of the calculated presence probability. The initial value of the presence probability is zero % (0%). However, it is acceptable for the object detection device 10 to use another value (not 0%) of the presence probability.

In step S105 shown in FIG. 2, the object detection device 10 detects whether a next scanning period has arrived.

When the detection result in step S105 is negative ("NO" in step S105), i.e. represents that the next scanning period has not arrived, the operation flow returns to step S105, i.e. the object detection device 10 performs step S105 again. The next scanning period represents a next scanning timing to scan the detection target.

On the other hand, when the detection result in step S105 is positive ("YES" in step S105), i.e. represents that the next scanning period has arrived, the operation flow progresses to step S110.

In step S110, the first detection part 11 in the object detection device 10 performs the first detection method to detect the presence of the detection target, for example, to detect an inter-vehicle distance between the own vehicle 100 and the detection target and a relative speed of the detection target with respective to the own vehicle 100. The operation flow progresses to step S115.

In step S115, the second detection part 12 in the object detection device 10 performs the second detection method to detect the presence of the detection target, for example, to detect the inter-vehicle distance between the own vehicle 100 and the detection target and the relative speed of the detection target with respective to the own vehicle 100.

It is acceptable for the first detection part 11 and the second detection part 12 to perform the first detection method and the second detection method simultaneously.

It is also acceptable for the second detection part 12 to perform the second detection method in step S115 before the first detection part 11 performs the first detection method in step S110. The operation flow progresses to step S120.

In step S120, the presence probability calculation part 13 calculates a presence probability of the detection target on the basis of the detection result of the first detection method and the detection result of the second detection method. Specifically, the presence probability calculation part 13 reads and refers to the presence probability adjustment map 15 and determines whether it is necessary to increase, reduce or maintain the presence probability of the detection target on the basis of the detection result in step S110 and the detection result in step S120 of whether the detection target (as an object) has been detected. The presence probability calculation part 13 calculates the presence probability of the detection target at the current scanning period on the basis of the presence probability obtained at the previous scanning period.

Figure 3:
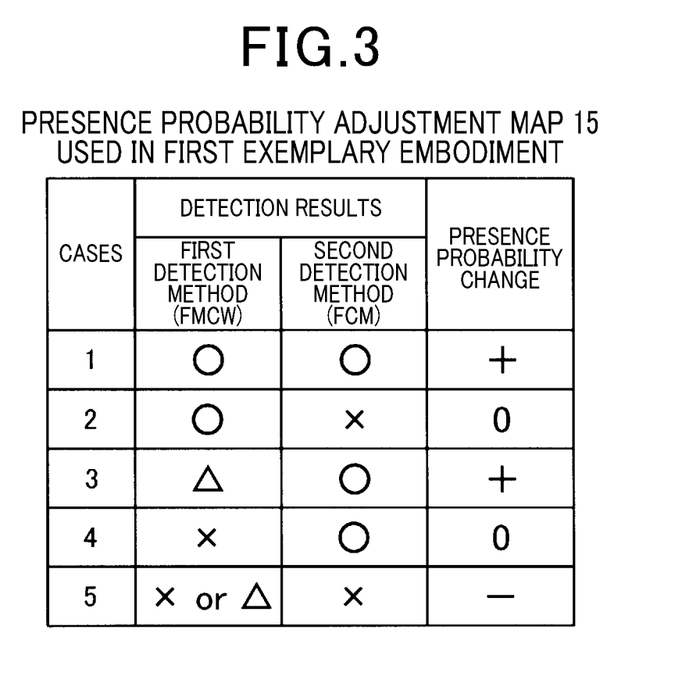
FIG. 3 is a view explaining a presence probability adjustment map used by the object detection device according to the first exemplary embodiment of the present disclosure shown in FIG. 1.

FIG. 3 is a view explaining the presence probability adjustment map 15 used by the object detection device 10 according to the first exemplary embodiment of the present disclosure shown in FIG. 1. As shown in FIG. 3, the probability adjusting map 15 shows five cases 1, 2, 3, 4 and 5, each of which represents a relationship between a detection result of the first detection part 11 using the first detection method, a detection result of the second detection part 12 using the second detection method, and a presence probability change. In the presence probability adjustment map 15 shown in FIG. 3, character O represents that the detection target (as an object) has been detected, i.e. the detection target is reliably present. Character X represents that no detection target is detected, i.e. any detection target is not present. Character Δ represents that a peak of the detection result has been detected in only one of the rising period and the falling period of the scanning period.

In the presence probability adjustment map 15 shown in FIG. 3, the case 1 shows that the detection target has been detected by both the first detection part 11 using the first detection method (FMCW method) and the second detection part 12 using the second detection method (FCM method), and the presence probability change of the case 1 is designated by character +. That is, character + of the presence probability change represents to increase the presence probability by a predetermined rate. The object detection device 10 according to the first exemplary embodiment uses the predetermined rate of 10%. It is acceptable for the object detection device 10 to use another value of the predetermined rate. The object detection device 10 calculates, in the current scanning period of the case 1, the presence probability which is increased by 10% of the presence probability used in the previous scanning period.

In the presence probability adjustment map 15 shown in FIG. 3, the case 2 shows that the detection target has been detected by the first detection part 11 using the first detection method (FMCW method) only. The second detection part 12 using the second detection method (FCM method) does not detect the presence of the detection target. The presence probability change of the case 2 is designated by Character 0 (zero). That is, character 0 of the presence probability change represents maintaining the presence probability. Accordingly, in the current scanning period of the case 2, the object detection device 10 according to the first exemplary embodiment continuously uses the presence probability of the detection target obtained in the previous scanning period.

In the presence probability adjustment map 15 shown in FIG. 3, the case 3 shows that the detection target has been detected, in one of the rising period and the falling period of the scanning period, by the first detection part 11 using the first detection method (FMCW method). The second detection part 12 using the second detection method (FCM method) detects the presence of the detection target. The presence probability change of the case 3 is designated by Character +. That is, Character 0 of the presence probability change represents maintaining the presence probability. Similar to the case 1, the object detection device 10 calculates, in the current scanning period of the case 3, the presence probability which is increased by 10% of the presence probability used in the previous scanning period.

In the presence probability adjustment map 15 shown in FIG. 3, the case 4 shows that the first detection part 11 using the first detection method does not detect the presence of the detection target, and the second detection part 12 using the second detection method detects the presence of the detection target. The presence probability change of the case 4 is designated by Character 0 (zero). Similar to the case 2, in the current scanning period of the case 4, the object detection device 10 according to the first exemplary embodiment continuously uses the presence probability of the detection target obtained in the previous scanning period.

In the presence probability adjustment map 15 shown in FIG. 3, the case 5 shows that the detection target has not been detected in one of the rising period and the falling period of the scanning period by the first detection part 11 using the first detection method (FMCW method). The second detection part 12 using the second detection method (FCM method) does not detect the presence of the detection target.

In the case 5, character $\Delta$ indicates when the detection target is detected in only one of the rising period and the falling period of the scanning period, i.e. when a peak value has been detected in only one of the rising period and the falling period of the scanning period. Further, character X indicates when the detection target is detected in both the rising period and the falling period of the scanning period, i.e. when a peak value has been detected in both the rising period and the falling period of the scanning period.

The presence probability change of the case 3 is designated by Character –. That is, Character – of the presence probability change represents reducing the presence probability by a predetermined rate.

The object detection device 10 according to the first exemplary embodiment uses the predetermined rate of 10%. It is acceptable for the object detection device 10 to use another value of the predetermined rate. The object detection device 10 calculates, in the current scanning period of the case 5, the presence probability which is reduced by 10% of the presence probability used in the previous scanning period.

As previously described in detail, the object detection device 10 according to the first exemplary embodiment increases the presence probability of the detection target by 10% of the previously-used presence probability calculated in the previously scanning period when both the first detection part 11 using the first detection method (FMCW) and the second detection part 12 using the second detection method (FCM) detect the presence of the detection target. In other words, it can be recognized that the detection target has a high presence probability when both the first detection method (FMCW) and the second detection method (FCM) detect the presence of the detection target.

On the other hand, when both the first detection part 11 using the first detection method (FMCW) and the second detection part 12 using the second detection method (FCM) do not detect the presence of the detection target, or when the first detection method (FMCW) detects the detection target in only one of the rising period and the falling period of the scanning period and the second detection method (FCM) does not detect the presence of the detection target, the object detection device 10 reduces the presence probability of the detection target, which has been previously calculated in the previous scanning period, by the predetermined rate of 10%, and uses the reduced presence probability as the current presence probability because the detection target has a low presence probability in those situations.

As previously described, when one of the first detection part 11 and the second detection part 12 detects the presence of the detection target, the object detection device 10 does not change, i.e. maintains the presence probability of the detection target which has been previously calculated in the previous scanning period.

When one of the first detection part 11 and the second detection part 12 detects the presence of the detection target, and the other detection part does not detect the presence of the detection target, it can be considered that the own vehicle 100 does not travel forward in a straight direction or reflection points, at which transmission waves are reflected, vary due to a vehicle pitch phenomenon of the detection target (for example, a preceding vehicle), or when one of first detection part 11 and the second detection part 12 is faulty. When an unclear situation of presence of the detection target occurs previously described, the object detection device 10 according to the first exemplary embodiment does not change, and maintains the presence probability of the detection target obtained in the previous scanning period so as to avoid an occurrence of incorrect detection.

As shown in FIG. 2, the operation flow returns to step S105 from step S210. Accordingly, when a next scanning period has arrived, the object detection device 10 repeatedly performs step S110 to S130 so as to adjust the presence probability of the detection target, as a new presence probability, or maintaining the previous presence probability.

For example, when both the first detection part 11 using the first detection method and the second detection part 12 using the first detection method detect the presence of the detection target in the first scanning period, the object detection device 10 increases the presence probability of the detection target by 10%. The object detection device 10 transmits the presence probability of 10% to the drive assist ECU 200 because the initial value of the presence probability of the detection target is zero. As previously described, when the predetermined threshold value to start the execution of the safety operation is 90%, no safety operation is performed. When the first detection part 11 and the second detection part 12 continuously detect the presence of the detection target during a period from the first scanning period to the ninth scanning period, the presence probability reaches 90%. When receiving the presence probability of 90% transmitted from the object detection device 10, the drive assist ECU 200 starts to operate the safety operation of the own vehicle 100 because the received presence probability of 90% has reached the predetermined threshold value.

As previously described, the object detection device 10 according to the first exemplary embodiment is mounted on the own vehicle 100 and detects the presence of the detection target on the basis of the different detection methods such as the first detection method (FMCW) and the second detection method (FCM) using the detection results of the millimeter wave sensor 21. This structure makes it possible to increase detection accuracy of the detection target when compared with a detection accuracy of the detection target obtained by using a single detection method.

Further, the object detection device 10 according to the first exemplary embodiment increases the presence probability of the detection target previously calculated in the previous scanning period and uses the increased presence probability as the current presence probability when both the first detection part 11 and the second detection part 12 detect the presence of the detection target. This structure makes it possible to increase the presence probability of the detection target when the detection target has a high presence probability, and to increase the detection accuracy of the detection target.

Further, when both the first detection part 11 and the second detection part 12 do not detect the presence of the detection target, the object detection device 10 reduces the presence probability which has been previously obtained in the previous scanning period, it is possible to reduce the presence probability as the current presence probability when the detection target has a low presence probability.

Still further, when one of the first detection part 11 and the second detection part 12 detects the presence of the detection target and the other detection part does not detect the presence of the detection target, the object detection device 10 according to the first exemplary embodiment does not change, i.e. maintains the presence probability of the detection target which has been obtained in the previous scanning period. This structure makes it possible to increase the detection accuracy of the detection target and to prevent an incorrect detection from occurring when an unclear situation of presence of the detection target has occurred.

Second Exemplary Embodiment

A description will be given of the object detection device 10 according to the second exemplary embodiment with reference to FIG. 4 and FIG. 5.

Figure 4:
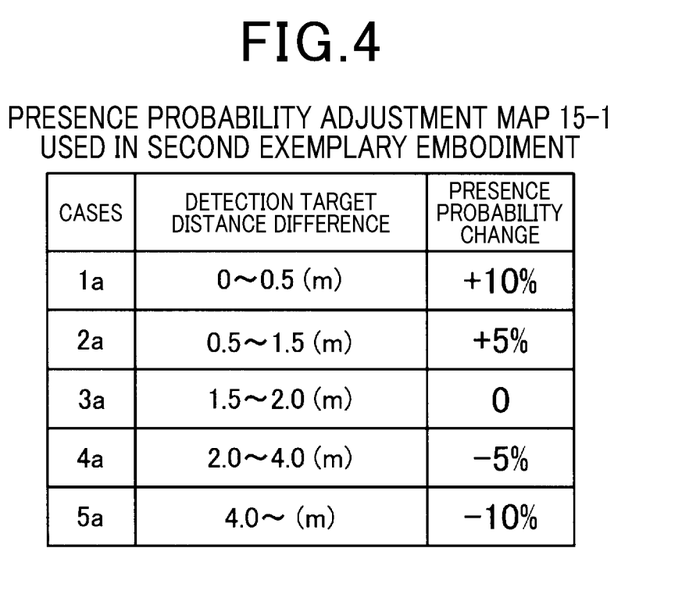
FIG. 4 is a view explaining the probability adjusting map used by the object detection device according to a second exemplary embodiment of the present disclosure.

FIG. 4 is a view explaining a presence probability adjustment map 15-1 used by the object detection device 10 according to the second exemplary embodiment of the present disclosure.

The second exemplary embodiment shows the presence probability adjustment map 15-1 shown in FIG. 4 which is different from the probability adjusting map 15 shown in FIG. 3 used by the object detection device 10 according to the first exemplary embodiment. The same components between the first exemplary embodiment and the second exemplary embodiment will be referred to the same reference numbers and characters. The explanation of the same components is omitted here for brevity.

As shown in FIG. 4, the presence probability adjustment map 15-1 shows five cases 1a, 2a, 3a, 4a and 5a, each of which represents a relationship between a detection target distance difference and a presence probability change. The detection target distance difference represents a difference between the position (as the target position) of the detection target detected by the first detection part 11 and the position (as the target position) of the detection target detected by the second detection part 12.

In the case 1a shown in FIG. 4, the detection target distance difference is less than 0.5 m and not less than 0 m. The case 1a has the presence probability change of +10%.

In the case 2a shown in FIG. 4, the detection target distance difference is not less than 0.5 m and less than 1.5 m. The case 2a has the presence probability change of +5%.

In the case 3a shown in FIG. 4, the detection target distance difference is not less than 1.5 m and less than 2.0 m. The case 3a has the presence probability change of zero, i.e. the presence probability is maintained in the case 3a.

In the case 4a shown in FIG. 4, the detection target distance difference is not less than 2.0 m and less than 4.0 m. The case 4a has the presence probability change of −5%.

In the case 5a shown in FIG. 4, the detection target distance difference is not less than 4.0 m. The case 5a has the presence probability change of −10%.

(Object Detection Process)

A description will be given of the object detection process performed by the object detection device 10 and the object detection method according to the second exemplary embodiment with reference to FIG. 5.

Figure 5:
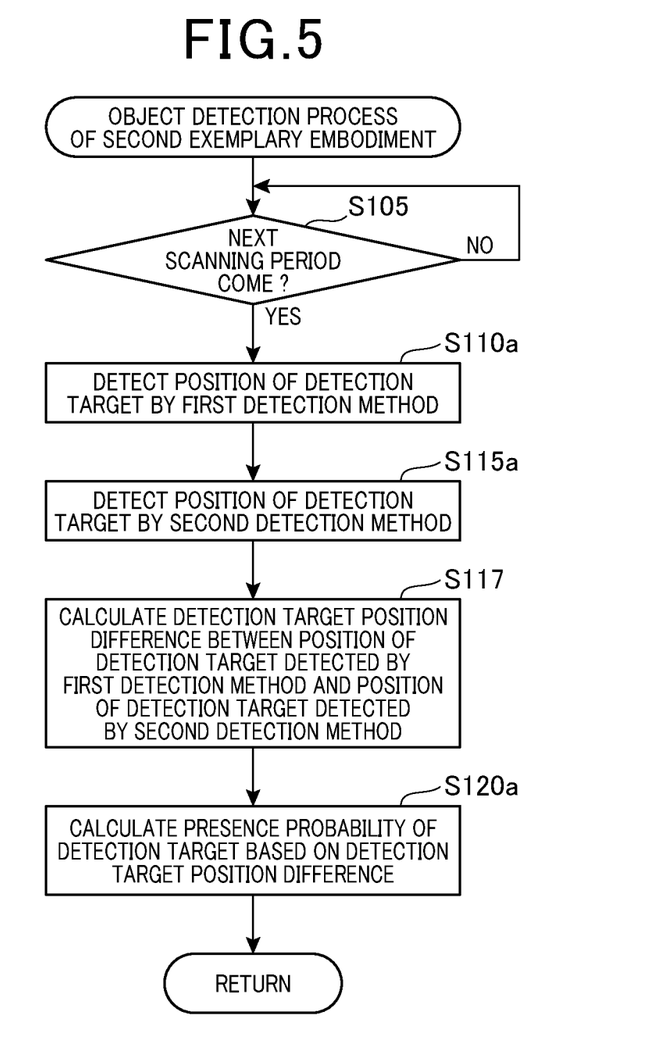
FIG. 5 is a flow chart showing the object detection process performed by the object detection device according to the second exemplary embodiment.

FIG. 5 is a flow chart showing the object detection process performed by the object detection device 10 according to the second exemplary embodiment.

As shown in FIG. 5, the object detection process of the second exemplary embodiment has step S110a, step S115a and step S120a which are different from step S110, step S115 and step S120 in the object detection process according to the first exemplary embodiment shown in FIG. 2. Further, the object detection process of the second exemplary embodiment has step S117 performed after step S115a and before step 120a. The second exemplary embodiment and the first exemplary embodiment perform the same step S105. The explanation of the same step S105 between the second exemplary embodiment and the first exemplary embodiment is omitted for brevity.

When the detection result in step S105 is positive ("YES" in step S105), i.e. represents that a next scanning period has arrived, the operation flow progresses to step S110a.

In step S110a, the first detection part 11 in the object detection device 10 performs the first detection method to detect, i.e. identify the position of the detection target. The operation flow progresses to step S115a.

In step S115a, the second detection part 12 in the object detection device 10 performs the second detection method to detect, i.e. identify the position of the detection target.

In step S110a and step S115a, neither of the first detection part 11 nor the second detection part 12 calculate the relative speed of the detection target with respect of the own vehicle 100, which is different from step S110 and S115 performed in the first exemplary embodiment. The operation flow progresses to step S117.

In step S117, the presence probability calculation part 13 calculates the detection target distance difference between the detection target distance detected by the first detection part 11 and the detection target distance detected by the second detection part 12. As previously described, this detection target distance difference represents a distance difference between the target position of the detection target detected by the first detection part 11 and the target position of the detection target detected by the second detection part 12. The operation flow progresses to step S120a.

In step S120a, the presence probability calculation part 13 calculates the presence probability of the detection target on the basis of the detection target distance difference calculated in step S117 while referring to the presence probability adjustment map 15-1. For example, when the detection target distance difference calculated in step S117 is 0.4 m, this situation corresponds to the case 1a. Accordingly, the presence probability calculation part 13 increases the previous presence probability of the detection target by 10%, and provides the increased presence probability of the detection target to be used in the current scanning period.

In step S120a, the presence probability calculation part 13 calculates the presence probability of the detection target by referring to the presence probability adjustment map 15-1. As shown in FIG. 4, the shorter the detection target distance difference is, the higher the presence probability of the detection target is calculated. That is, the shorter the detection target distance difference is, the higher a possible case is, in which both that the first detection part 11 and the second detection part 12 detect the same detection target at a similar location to each other. For this reason, the presence probability adjustment map 15-1 has an improved structure in which the shorter the detection target distance difference is, the higher the presence probability of the detection target becomes.

As previously described, the object detection device 10 according to the second exemplary embodiment has the same features and effects of the object detection device 10 according to the first exemplary embodiment. In addition, the object detection device 10 according to the second exemplary embodiment calculates the presence probability of the detection target higher according to the reduction of the detection target distance difference detected by the first detection part 11 and the second detection part 12. This structure makes it possible to increase the detection accuracy of the detection target such as a preceding vehicle, a pedestrian, etc.

When the detection target distance difference between the detection target distance detected by the first detection part 11 and the detection target distance detected by the second detection part 12 is shorter, the probability that the first detection part 11 and the presence probability of the detection target detects the same detection target becomes higher. In this situation, the probability that detection target is present is high.

Third Exemplary Embodiment

A description will be given of the object detection device 10 according to the third exemplary embodiment with reference to FIG. 6 and FIG. 7.

Figure 6:
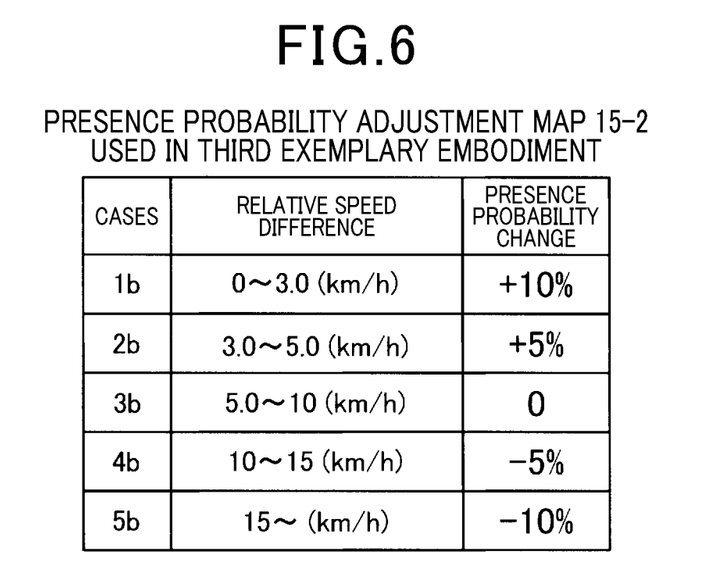
FIG. 6 is a view explaining the probability adjusting map used by the object detection device according to a third exemplary embodiment of the present disclosure.

FIG. 6 is a view explaining a presence probability adjustment map 15-2 used by the object detection device 10 according to the third exemplary embodiment of the present disclosure.

The third exemplary embodiment shows the presence probability adjustment map 15-2 shown in FIG. 6 which is different from the probability adjusting map 15 shown in FIG. 3 used by the object detection device 10 according to the first exemplary embodiment. The same components between the first exemplary embodiment and the second exemplary embodiment will be referred to the same reference numbers and characters. The explanation of the same components is omitted here for brevity.

As shown in FIG. 6, the presence probability adjustment map 15-2 shows five cases 1b, 2b, 3b, 4b and 5b, each of which represents a relationship between a relative speed difference and a presence probability change. The relative speed difference represents a difference between the relative speed of the detection target with respect to the own vehicle 100 detected by the first detection part 11 and the relative speed of the detection target with respect to the own vehicle 100 detected by the second detection part 12.

In the case 1b shown in FIG. 6, the relative speed difference is less than 3 km/h and not less than 0 km/h. The case 1b has the presence probability change of +10%.

In the case 2b shown in FIG. 6, the relative speed difference is not less than 3.0 km/h and less than 5.0 km/h. The case 2b has the presence probability change of +5%.

In the case 3b shown in FIG. 6, the relative speed difference is not less than 5.0 km/h and less than 10 km/h. The case 3b has the presence probability change of zero, i.e. the presence probability is maintained in the case 3b.

In the case 4b shown in FIG. 6, the relative speed difference is not less than 10 km/h and less than 15 km/h. The case 4b has the presence probability change of −5%.

In the case 5b shown in FIG. 6, the relative speed difference is not less than 15 km/h. The case 5b has the presence probability change of −10%.

(Object Detection Process)

A description will be given of the object detection process performed by the object detection device 10 according to the third exemplary embodiment with reference to FIG. 7.

Figure 7:
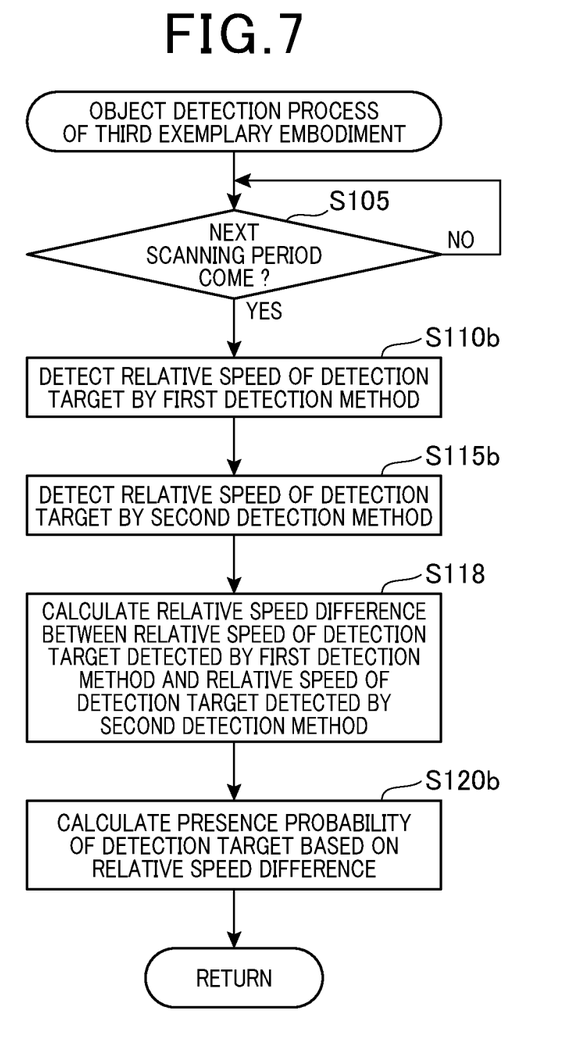
FIG. 7 is a flow chart showing the object detection process performed by the object detection device according to the third exemplary embodiment.

FIG. 7 is a flow chart showing the object detection process performed by the object detection device 10 according to the third exemplary embodiment.

As shown in FIG. 7, the object detection process of the third exemplary embodiment has step S110b, step S115b and step S120b which are different from step S110, step S115 and step S120 in the object detection process according to the first exemplary embodiment shown in FIG. 2. Further, the object detection process of the third exemplary embodiment has step S118 performed after step S115b and before step 120b. The third exemplary embodiment and the first exemplary embodiment perform the same step S105. The explanation of the same step S105 between the third exemplary embodiment and the first exemplary embodiment is omitted for brevity.

When the detection result in step S105 is positive ("YES" in step S105), i.e. represents that a next scanning period has arrived, the operation flow progresses to step S110b.

In step S110b, the first detection part 11 in the object detection device 10 performs the first detection method to calculate a relative speed of the detection target with respect to the own vehicle 100. The operation flow progresses to step S115b.

In step S115b, the second detection part 12 in the object detection device 10 performs the second detection method to a relative speed of the detection target with respect to the own vehicle 100.

In step S110 and step S115 shown in FIG. 2 according to the first exemplary embodiment shown in FIG. 2, each of the first detection part 11 and the second detection part 12 calculates the relative speed of the detection target with respect of the own vehicle 100.

On the other hand, in step S110b and step S115b according to the third exemplary embodiment shown in FIG. 7, each of the first detection part 11 and the second detection part 12 does not identify the position of the detection target. This is different from the first exemplary embodiment. The operation flow progresses to step S118.

In step S118, the presence probability calculation part 13 calculates a relative speed difference between the relative speed detected by the first detection part 11 and the relative speed detected by the second detection part 12. As previously described, this relative speed difference represents a difference between the relative speed of the detection target with respect to the own vehicle 100 detected by the first detection part 11 and the relative speed of the detection target with respect to the own vehicle 100 detected by the second detection part 12. The operation flow progresses to step S120b.

In step S120b, the presence probability calculation part 13 calculates the presence probability of the detection target on the basis of the relative speed difference calculated in step S118 while referring to the presence probability adjustment map 15-2. For example, when the relative speed difference calculated in step S118 is 2.0 km/h, this situation corresponds to the case 1b. Accordingly, the presence probability calculation part 13 increases the previous presence probability of the detection target by 10%, and provides the increased presence probability of the detection target to be used in the current scanning period.

In step S120b, the presence probability calculation part 13 calculates the presence probability of the detection target by referring to the presence probability adjustment map 15-2. As shown in FIG. 6, the smaller the relative speed difference is, the higher the presence probability of the detection target is calculated. That is, the smaller the relative speed difference is, the higher a possible case is, in which both that the first detection part 11 and the second detection part 12 detect the same detection target at a similar location to each other. For this reason, the presence probability adjustment map 15-2 has an improved structure in which the smaller the relative speed difference is, the higher the presence probability of the detection target becomes.

As previously described, the object detection device 10 according to the third exemplary embodiment has the same features and effects of the object detection device 10 according to the first exemplary embodiment. In addition, the object detection device 10 according to the third exemplary embodiment calculates the presence probability of the detection target higher according to the reduction of the relative speed difference detected by the first detection part 11 and the second detection part 12. This structure makes it possible to increase the detection accuracy of the detection target such as a preceding vehicle, a pedestrian, etc.

When the relative speed difference between the relative speed of the detection target with respect to the own vehicle 100 detected by the first detection part 11 and the relative speed of the detection target with respect to the own vehicle 100 detected by the second detection part 12 is smaller, the probability that the first detection part 11 and the presence probability of the detection target detects the same detection target becomes higher. In this situation, the probability that detection target is present is high.

First Modification

As previously described, the object detection device 10 according to each of the first, second and third exemplary embodiments uses the millimeter wave radar 21 capable of transmitting millimeter waves, and detects and identifies a detection target on the basis of reflected millimeter waves reflected by the detection target. However, the concept of the present disclosure is not limited by the structure of each of the first, second and third exemplary embodiments. For example, it is possible to use an imaging recognition sensor (imaging camera) instead of using the millimeter wave radar 21. In the first modification, it is possible for the first detection part 11 to perform a pattern recognition method for comparing the captured image with predetermined pattern images, and for the second detection part 12 to perform a machine learning method which uses a known artificial intelligence method to learn assumed detection targets, and stores the learned detection targets in advance. The artificial intelligence is a known method. It is possible for the object detection device 10 to use various types of sensors which detect various types of detection targets such as preceding vehicles or pedestrians.

Second Modification

As previously described, the object detection device 10 according to each of the first, second and third exemplary embodiments uses the millimeter wave sensor 21 on the basis of the frequency modulation continuous wave method (FMCW method) and the fast-chirp modulation method (FCM method). However, the concept of the present disclosure is not limited by the structure of each of the first, second and third exemplary embodiments. For example, it is possible to use other two types of object detection methods, for example, FCM method and a frequency modulated shift keying method (FMSK method). It is also acceptable for the object detection device 10 to use the pair of the FMCW method and a 2-frequency continuous wave method (2-frequency CW method).

Third Modification

As previously described, the object detection device 10 according to each of the first, second and third exemplary embodiments uses the millimeter wave sensor 21 and two types of object detection methods, i.e. the FMCW method and the FCM method. However, the concept of the present disclosure is not limited by the structure of each of the first, second and third exemplary embodiments. It is possible for the object detection device 10 to use a plurality of object detection methods, for example, three types of object detection methods, i.e. the FMSK method in addition to the FMCW method, the FCM method.

When those three types of object detection methods, the object detection device 10 uses the presence probability adjustment map which represents the following three cases (i), (ii) and (iii).

(i) When the three types of object detection methods (the FMCW method, the FCM method and the FMSK method) detect presence of a detection target, the object detection device 10 increases the presence probability of the detection target by 20%.

(ii) When the two types of object detection methods in the three detection methods (the FMCW method, the FCM method and the FMSK method) detect the presence of the detection target, the object detection device 10 increases the presence probability of the detection target by 10%.

(i) When the three types of object detection methods (the FMCW method, the FCM method and the FMSK method) do not detect presence of the detection target, the object detection device 10 reduces the presence probability of the detection target by 20%.

In the case (ii), it is acceptable to detect the presence of the detection target when a peak value of the reflected millimeter waves is detected in the rising period or the falling period of the scanning period in the FMCW method.

When the object detection device 10 according to the second exemplary embodiment uses the three types of object detection methods (the FMCW method, the FCM method and the FMSK method), it is acceptable for each of the three types of object detection methods to detect a distance between the detection target and the own vehicle 100. In this case, the object detection device 10 determines the presence probability of the detection target so that the presence probability of the detection target is increased according to the reduction of an average value of the calculated distances. Further, it is acceptable for the object detection device 10 to increase the presence probability of the detection target according to the reduction of a difference between two larger distances in the three distances calculated by the three types of object detection methods. In general, when at least two types of object detection methods detect the presence of the detection target, it is acceptable for the object detection device 10 to increase the presence probability of the detection target according to the reduction of variation of the detected positions of the detection targets detected by those object detection methods.

When the structure of the third modification using the three types of object detection methods (for example, the FMCW method, the FCM method and the FMSK method) is applied to the object detection device 10 according to the third exemplary embodiment, the object detection device 10 calculates a relative speed difference between the relative speeds detected by the three types of object detection methods. In this case, it is acceptable for the object detection device 10 to increase the presence probability of the detection target according to reduction of an average value of the relative speed differences. Further, it is acceptable to increase the presence probability of the detection target according to reduction of the maximum relative speed difference. In general, when at least two types of object detection methods detect the presence of the detection target, it is acceptable to increase the presence probability of the detection target according to reduction of variation of the detected relative speeds.

As can be understood from the improved structure of each of the first to third exemplary embodiments and the first to third modifications, previously described, it is possible to apply, to the object detection device 10 according to the first to third exemplary embodiments, the structure of the third modification which calculates the presence probability of the detection target on the basis of the detection results of a plurality of object detection methods.

Fourth Modification

As previously described, the object detection device 10 according to the first exemplary embodiment increases or reduces the previous presence probability of the detection target previously obtained in the previous scanning period on the basis of the detection results of the first detection part 11 and the second detection part 12 so as to obtain the current presence probability of the detection target in the current scanning period. However, the concept of the present disclosure is not limited by the structure of each of the first, second and third exemplary embodiments. For example, it is possible to calculate the current presence probability of the detection target regardless of using the previously-calculated presence probability of the detection target. For example, when the two types of object detection methods detect the presence of the detection target in the structure of the first exemplary embodiment, the object detection device 10 determines that the presence probability of the detection target is 90%. On the other hand, when only one of the two types of object detection methods detects the presence of the detection target in the structure of the first exemplary embodiment, the object detection device 10 determines that the presence probability of the detection target is 50%. Further, when the two types of object detection methods do not detect the presence of the detection target in the structure of the first exemplary embodiment, the object detection device 10 determines that the presence probability of the detection target is zero %. That is, it is possible to apply the structure of the presence probability calculation on the basis of the detection results of the two detection parts 11, 12 to each of the object detection device 10 according to the first to third exemplary embodiments.

Fifth Modification

As previously described, the object detection device 10 according to each of the first to third exemplary embodiments performs the periodic detection and calculation of the presence probability of the detection target. However, the concept of the present disclosure is not limited by the structure of each of the first, second and third exemplary embodiments. For example, it is acceptable for the object detection device 10 to perform the calculation of the presence probability of the detection target every 5 km of travel of the own vehicle 100.

Sixth Modification

As previously described, when the first detection part 11 and the second detection part 12 do not detect the presence of the detection target in the structure of the object detection device 10 according to the first exemplary embodiment, the object detection device 10 reduces the presence probability of the detection target obtained in the previous scanning period so as to obtain the presence probability of the detection target in the current scanning period. However, the concept of the present disclosure is not limited by the structure of each of the first, second and third exemplary embodiments. In this case, for example, it is acceptable for the object detection device 10 to maintain the presence probability of the detection target obtained in the previous scanning period. Further, it is acceptable to increase the presence probability of the detection target of a small value as compared with the presence of the detection target obtained when the object detection device 10 detects the presence of the detection target.

Seventh Modification

As previously described, when only one of the first detection part 11 and the second detection part 12 detects the presence of the detection target, the object detection device 10 according to the first exemplary embodiment maintains the presence probability of the detection target obtained in the previous scanning period, and uses the maintained presence probability of the detection target as the presence probability of the detection target in the current scanning period.

However, the concept of the present disclosure is not limited by the structure of each of the first, second and third exemplary embodiments. In this situation, it is acceptable for the object detection device 10 to increase or reduce the presence probability of the detection target obtained in the previous scanning period, and to use the obtained presence probability of the detection target as the presence probability of the detection target in the current scanning period.

Eighth Modification

As previously described, in the presence probability adjustment map 15-1 used by the object detection device 10 according to the second exemplary embodiment shows the five cases 1a, 2a, 3a, 4a and 5a, each of which represents the relationship between the detection target distance difference and the presence probability change. However, the concept of the present disclosure is not limited by this structure. It is acceptable to a plurality of cases instead of the five cases 1a, 2a, 3a, 4a and 5a.

Similarly, in the presence probability adjustment map 15-2 used by the object detection device 10 according to the third exemplary embodiment has the five cases 1b, 2b, 3b, 4b and 5b, each of which represents the relationship between the relative speed difference and the presence probability change. However, the concept of the present disclosure is not limited by this structure. It is acceptable to have a plurality of cases instead of the five cases 1b, 2b, 3b, 4b and 5b.

Furthermore, it is acceptable for the object detection device 10 according to each of the second and third exemplary embodiments to calculate the presence probability change on the basis of a predetermined equation using the in-vehicle distance between the detection target and the own vehicle 100 and the relative speed difference instead of using the presence probability adjustment map.

Ninth Modification

It is acceptable to use software programs so as to realize a part of functions of hardware elements used in the object detection device 10 according to each of the first to third exemplary embodiment and the modifications thereof.

Further, it is acceptable to use hardware elements so as to realize a part of functions of software programs used in the object detection device 10 according to each of the first to third exemplary embodiments and the modifications thereof. For example, it is acceptable to use one or modules composed of integrated circuits, discrete semiconductor circuits and a combination thereof so as to realize at least one of the functional parts composed of the first detection part 11, the second detection part 12, and the presence probability calculation part 13.

It is possible to provide a non-transitory computer readable storage medium for storing software programs (or computer programs) so as to realize the overall or a part of the functions of the object detection device 10 according to each of the first to third exemplary embodiments and various modifications. There are various types of non-transitory computer readable storage mediums, portable memory mediums such as flexible discs, compact disc read only memory (CD-ROM), a memory device in a computer such as a random access memory (RAM), a read only memory (ROM), etc. and a hard disk device as an external memory device mounted on a computer system. That is, the non-transitory computer readable storage medium represents various types of computer readable storage medium.

Incidentally, there often happens a possible case in which a single sensor, for example a millimeter waver sensor is mounted on a vehicle in the view of saving a load space and of reducing an overall weight and a manufacturing cost. When only a millimeter wave sensor is mounted on the vehicle, it is difficult for the detection device to correctly distinguish various types of objects from each other, which are located on a roadway, for example tunnels, pedestrian bridges, traffic signs, commercial boards placed on a roadway, and steel plates, manhole covers, etc. on a roadway along which vehicles are passing and on which pedestrians are walking. There has been a strong technical demand to provide the detection device with high detection accuracy mounted on a vehicle equipped with a single sensor such as a millimeter wave sensor.

The first to third exemplary embodiments and the modifications thereof according to the present disclosure provide the object detection device 10 for correctly detecting presence of a detection target with high accuracy even if the own vehicle has a single sensor such as the millimeter wave sensor. The object detection device 10 according to the present disclosure can solve the problem previously described.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. An object detection device, to be mounted on an own vehicle equipped with a sensor for detecting a detection target in surroundings of the own vehicle, the object detection device, which is connected to a drive assist electronic control unit, comprising a computer system including a central processing unit, the central processing unit of the computer system being configured to:
   perform a plurality of object detection methods, which are different from each other, each of the object detection methods being performed for each scanning period of a plurality of scanning periods of the sensor and each of the object detection methods performing a respective determination of whether a detection target is present in the surroundings of the own vehicle based on a detection result obtained by the sensor for each of the plurality of scanning periods;
   calculate, for each respective scanning period of the plurality of scanning periods, a presence probability of the detection target based on a result of the respective determinations performed by each of the object detection methods for the respective scanning period;
   determine whether all of the object detection methods determine that the detection target is present in a current scanning period of the plurality of scanning periods;
   increase, when determining that all of the object detection methods determine that the detection target is present in the current scanning period as a first determination case, a value of the presence probability of the detection target calculated for an immediately previous scanning period of the plurality of scanning periods;
   use the increased value of the presence probability of the detection target as a value of the presence probability of the detection target for the current scanning period;
   determine whether the value of the presence probability for the current scanning period reaches a predetermined threshold value; and
   determine that the detection target is actually present when it is determined that the value of the presence probability for the current scanning period reaches the predetermined threshold value.

2. The detection device according to claim 1, wherein the central processing unit of the computer system is further configured to:
   decrease, when determining that none of the object detection methods determines that the detection target is present in the current scanning period, the value of the presence probability of the detection target calculated for the immediately previous scanning period; and use the decreased value of the presence probability of the detection target as the value of the presence probability of the detection target for-the current scanning period.

3. The detection device according to claim 1, wherein the central processing unit of the computer system is further configured to:
   maintain, when determining that at least one of the object detection methods determines that the detection target is present in the current scanning period, the value of the presence probability of the detection target calculated for the immediately previous scanning period; and
   use the maintained value of the presence probability of the detection target as the value of the presence probability of the detection target for the current scanning period.

4. The detection device according to claim 3, wherein the central processing unit of the computer system is further configured to:
   maintain, when determining that at least one of the object detection methods determines that the detection target is present in the current scanning period, the value of the presence probability of the detection target calculated for the immediately previous scanning period; and
   use the maintained value of the presence probability of the detection target as the value of the presence probability of the detection target for the current scanning period.

5. The detection device according to claim 1, wherein:
   the plurality of object detection methods includes a first object detection method and a second object detection method; and
   the central processing unit of the computer system is further configured to:
      perform each of the object detection methods based on the detection result obtained by the sensor for each of the respective scanning periods to accordingly detect a position of the detection target, the first object detection method detecting a first position of the detection target, the second object detection method detecting a second position of the detection target; and
      calculate, when determining that at least the first and second object detection methods determine that the detection target is present in the current scanning period as a second determination case except for the first determination case, in accordance with the sum of:
         the value of the presence probability of the detection target for the current scanning period; and
         a predetermined additional probability, the predetermined additional probability being variably set depending on a distance between the first position and the second position obtained in the current scanning period.

6. The detection device according to claim 5, wherein
   a first value of the additional probability is variably set to correspond to a first value of the distance between the first position and the second position obtained for the current scanning period;
   a second value of the additional probability is variably set to correspond to a second value of the distance between the first position and the second position obtained for the current scanning period;
   when the second value of the distance is shorter than the first value of the distance, the second value of the additional probability is set to be higher than the first value of the additional probability; and
   when the second value of the distance is longer than the first value of the distance, the second value of the additional probability is set to be lower than the first value of the additional probability.

7. The detection device according to claim 1, wherein
   the plurality of object detection methods includes a first object detection method and a second object detection method; and
   the central processing unit of the computer system is further configured to:
      perform each of the object detection methods based on the detection result obtained by the sensor for each of the respective scanning periods to accordingly detect a relative speed of the detection target with respect to the own vehicle, the first object detection method detecting a first relative speed of the detection target, the second object detection method detecting a second relative speed of the detection target;
      calculate, when determining that at least the first and second object methods determine that the detection target is present in the current scanning period as a third determination case except for the first determination case, in accordance with the sum of:
         the value of the presence probability of the detection target in the current scanning period; and
         a predetermined additional probability, the predetermined additional probability being variably set depending on an absolute difference between the first relative speed and the second relative speed obtained in the current scanning period.

8. The detection device according to claim 7, wherein
   a first value of the additional probability is variably set to correspond to a first value of the absolute difference between the first relative speed and the relative speed obtained for the current scanning period;
   a second value of the additional probability is variably set to correspond to a second value of the absolute difference between the first relative speed and the second relative speed obtained for the current scanning period;
   when the second value of the absolute difference is lower than the first value of the absolute difference, the second value of the probability is set to be higher than the first value of the additional probability; and
   when the second value of the absolute difference is longer than the first value of the absolute difference, the second value of the additional probability is set to be lower than the first value of the additional probability.

9. An object detection method with use of a sensor mounted on an own vehicle, the method comprising:
   performing a plurality of object detection methods, which are different from each other, each of the object detection methods being performed for each scanning period of a plurality of scanning periods of the sensor and each of the object detection methods performing a respective determination of whether a detection target is present in surroundings of the own vehicle based on a detection result obtained by the sensor mounted on the own vehicle for each of the plurality of scanning periods;
   calculating, for each respective scanning period of the plurality of scanning periods, a presence probability of the detection target based on a result of the respective determinations performed by each of the object detection methods for the respective scanning period;
   determining whether all of the object detection methods detect the presence of the detection target in a current scanning period of the plurality of scanning periods;
   increasing, when determining that all of the object detection methods detect the presence of the detection target in the current scanning period, a value of the presence probability of the detection target calculated in an immediately previous scanning period in the scanning periods;

using the increased value of the presence probability of the detection target as a value of the presence probability of the detection target for the current scanning period;

determining whether the value of the presence probability for the current scanning period reaches a predetermined threshold value; and determining that the detection target is actually present when it is determined that the value of the presence probability for the current scanning period reaches the predetermined threshold value.

10. A non-transitory computer-readable storage medium storing program instructions that instruct a computer to:

perform a plurality of object detection methods, which are different from each other, each of the object detection methods being performed for each scanning period of a plurality of scanning periods of the sensor and each of the object detection methods performing a respective determination of whether a detection target is present in surroundings of an own vehicle based on a detection result obtained by a sensor mounted on the own vehicle for each of the plurality of scanning periods;

calculate, for each respective scanning period of the plurality of scanning periods, a presence probability of the detection target based on a result of the respective determinations performed by each of the object detection methods for the respective scanning period;

determine whether all of the object detection methods determine that the detection target is present in a current scanning period of the plurality of scanning periods;

increase, when determining that all of the object detection methods determine that the detection target is present in the current scanning period as a first determination case, a value of the presence probability of the detection target calculated for an immediately previous scanning period of the plurality of scanning periods;

use the increased value of the presence probability of the detection target as a value of the presence probability of the detection target for the current scanning period;

determine whether the value of the presence probability for the current scanning period reaches a predetermined threshold value; and determine that the detection target is present when it is determined that the value of the presence probability for the current scanning period reaches the predetermined threshold value.

* * * * *